United States Patent
Huynh et al.

(10) Patent No.: US 7,634,556 B2
(45) Date of Patent: Dec. 15, 2009

(54) ELECTRONIC MESSAGE MANAGEMENT

(75) Inventors: Anh Huynh, Beaverton, OR (US);
Hemingway Huynh, Beaverton, OR (US); Jeffrey Michael Farnsworth, Beaverton, OR (US); Cornelius Callely Marshall, Wilsonville, OR (US); Jeffrey Wayne Gaus, West Linn, OR (US)

(73) Assignee: Prolifiq Software Inc., Beaverton, OR (US)

( * ) Notice: Subject to any disclaimer, the term of this patent is extended or adjusted under 35 U.S.C. 154(b) by 731 days.

(21) Appl. No.: 11/296,587

(22) Filed: Dec. 6, 2005

(65) Prior Publication Data

US 2006/0168064 A1    Jul. 27, 2006

Related U.S. Application Data

(60) Provisional application No. 60/633,832, filed on Dec. 6, 2004, provisional application No. 60/393,176, filed on Jul. 1, 2002.

(51) Int. Cl.
*G06F 15/173* (2006.01)

(52) U.S. Cl. .................. 709/223; 709/226; 709/206

(58) Field of Classification Search .................. 709/223, 709/206, 225–226, 220, 217, 203
See application file for complete search history.

(56) References Cited

U.S. PATENT DOCUMENTS

| | | | |
|---|---|---|---|
| 6,092,114 A * | 7/2000 | Shaffer et al. | 709/246 |
| 6,292,554 B1 * | 9/2001 | Oden et al. | 370/466 |
| 6,625,460 B1 * | 9/2003 | Patil | 455/466 |
| 7,061,928 B2 * | 6/2006 | Giroti et al. | 370/422 |
| 2002/0016818 A1 * | 2/2002 | Kirani et al. | 709/217 |
| 2002/0073217 A1 * | 6/2002 | Ma et al. | 709/246 |
| 2003/0055925 A1 * | 3/2003 | McAlinden | 709/221 |
| 2003/0110234 A1 * | 6/2003 | Egli et al. | 709/217 |
| 2003/0236892 A1 * | 12/2003 | Coulombe | 709/228 |

OTHER PUBLICATIONS

Multiforce, Cforce, Salesforce.com, internet publication, http://www.salesforce.com.

* cited by examiner

*Primary Examiner*—Philip B Tran
(74) *Attorney, Agent, or Firm*—Schwabe Willaimson & Wyatt (57) ABSTRACT

In accordance with embodiments of the invention, message management services are provided for creating and/or adapting electronic messages with digital content items.

20 Claims, 4 Drawing Sheets

ELECTRONIC MESSAGE MANAGEMENT

RELATED APPLICATIONS

This non-provisional patent application claims priority to U.S. provisional patent application No. 60/633,832, filed Dec. 6, 2004 and to co-pending U.S. non-provisional patent application Ser. No. 10/976,057, filed Oct. 27, 2004, and Ser. No. 10/611,698, filed Jun. 30, 2003, which in turn claims priority to U.S. provisional patent application No. 60/393,176 filed on Jul. 1, 2002, all of which are hereby fully incorporated by reference. If any portion of this application should be determined to contradict any portion of application Nos. 60/633,832, 60/393,176, Ser. No. 10/611,698, or 10/976,057, for the purpose of this application, the description provided herein shall control.

FIELD

This present invention is directed to the field of electronic messaging, and in particular to management and distribution of electronic messages.

BACKGROUND

Electronic communications provide a powerful means of communicating content to a targeted audience. Traditional efforts utilizing electronic communications involve a user assembling content and distributing content to selected recipients. While this may provide an effective strategy in many circumstances, it requires significant computational resources to provide access and control of the content to be incorporated into the message, as well as human resources to direct the creation of the message.

BRIEF DESCRIPTION OF THE DRAWINGS

The invention is illustrated by way of example and not by way of limitation in the figures of the accompanying drawings, in which the like references indicate similar elements and in which.

DETAILED DESCRIPTION

In the description to follow, various aspects of the present invention will be described, and specific configurations will be set forth. However, embodiments of the present invention may be practiced with only some or all aspects, and/or without some of these specific details. In other instances, well-known features may be omitted or simplified in order not to obscure the description.

The description will be presented in terms of operations performed by a processor based device, using terms such as receiving, transmitting, determining, identifying, displaying and the like, consistent with the manner commonly employed by those skilled in the art to convey the substance of their work to others skilled in the art. As is well understood by those skilled in the art, the quantities take the form of electrical, magnetic, or optical signals capable of being stored, transferred, combined, and otherwise manipulated through mechanical, electrical and/or optical components of the processor based device.

Various operations will be described as multiple discrete steps in turn, in a manner that is most helpful in understanding embodiment of the present invention; however, the order of description should not be construed as to imply that these operations are necessarily order dependent. In particular, these operations need not be performed in the order of presentation.

The description repeatedly uses the phrase "in one embodiment", which does not necessarily refer to the same embodiment, although it may. Furthermore, the terms "comprising", "including", "having", and the like, as used in the present application, are synonymous.

The phrase "A and/or B" means "(A), (B), or (A and B)." The phrase "at least one of A, B, and C" means "(A), (B), (C), (A and B), (A and C), (B and C), or (A, B, and C)."

In accordance with embodiments of the present invention, message management services may be provided for generating and transmitting electronic messages having digital content items to one or more designated recipients at the receipt of a message construct. Additionally, embodiments of the present invention may provide for the adaptation of the form and/or content of the electronic message based on capabilities and/or preferences associated with the message recipient.

Figure 1:
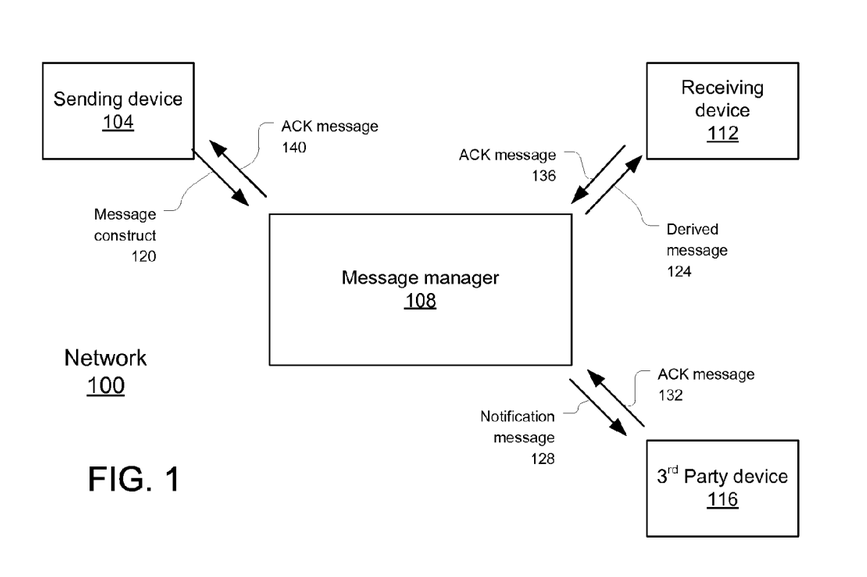
FIG. 1 illustrates a network within which a message management service may be employed in accordance with an embodiment of the present invention.

FIG. 1 illustrates a network 100 within which a message management service (MMS) may be employed in accordance with an embodiment of the present invention may be practiced. In this embodiment, a sending device 104 may be communicatively coupled to a message manager 108, which may, in turn, be communicatively coupled to a receiving device 112 and a third-party device 116, as shown. In various embodiments, these elements may be coupled to one another through one or more communication networks, including both wired and wireless communication links, ranging from local networks to one or more global interconnected networks such as the publicly-switched telephone network (PSTN), Internet or World Wide Web.

The sending device 104 may transmit an electronic message, e.g., message construct 120, to the message manager 108, including construct information for construction and/or delivery of an electronic message to a recipient. The construct information may include recipient information, e.g., information about a recipient associated with the receiving device 112 and/or requested content information, e.g., information that is directly and/or indirectly related to content that the recipient is, or may be, interested in. As used herein, content that the recipient is, or may be, interested in may be also be referred to as "requested content." It may be noted that requested content need not be explicitly requested by the recipient in all embodiments. Requested content information directly related to the requested content could include, e.g., a request for information on a particular product and/or service (hereinafter collectively referred to as "core content"). Requested content information indirectly related to requested content could include, e.g., information on recipient's occupation, interests, hobbies, work address, home address, timeframe for making a purchase of products/services, etc. (hereinafter collectively referred to a "peripheral content"). In one embodiment, the message manager 108 may derive the requested content, in whole or in part, from this peripheral content.

Briefly, the message manager 108 may receive the message construct 120 from the sending device 104, including identification of the recipient and requested content information, and generate an electronic message 124 according to a message generation specification. The message generation specification may direct the generation of the electronic message 124 through providing associations between requested content information, received from the sending device 104, and message templates and content controlled and accessible by the message manager 108, to be described in further detail below. As used herein the electronic message 124 may also be referred to as derived message 124 as its formation is at least partly derived from the message construct 120.

In various embodiments, the content may include any number of digital content elements such as, but not limited to, text, data, image, audio, video, web, executable elements and the like. Digital content elements may also refer to links or other user interface controls designed to enable recipients to obtain further information about a message, to forward the message to another recipient, to request to not receive similar messages in the future, and so forth.

As used herein electronic messages, including the derived message 124, may be of a variety of message types including but not limited to a text message, a multimedia message, an electronic mail (e-mail), a file (either coupled to one of the earlier described message types or transferred independently), e.g., a extensible markup language (XML) file, and the like delivered over appropriate channel delivery services including but not limited to simple messaging service (SMS), multimedia messaging service (MMS), the Internet and the like. Electronic messages may be delivered according to a variety of message transfer protocols including but not limited to transmission control protocol/Internet protocol (TCP/IP), simple mail transfer protocol (SMTP), hyper-text transfer protocol (HTTP), Global System for Mobile Communications (GSM), file transfer protocol (FTP), and protocols directed toward communication of markup language files ((e.g., XML) such as, simple object access protocol (SOAP), XML-remote procedure call (RPC), Global XML Web Services Architecture (GXA), Representational State Transfer (REST), and the like. As used herein, the particular message type and corresponding services, protocols, structures, etc. to communicate that particular message type from one device to another over the network may be referred to as a delivery channel.

The device 104, message manager 108, device 112, and/or device 116 may include user-devices and/or server devices such as a host server equipped with the device, or communicatively coupled thereto, to facilitate creation and/or transmission of the various electronic messages. For example, in an embodiment a host server may be a mail server designed to deliver and/or receive e-mail. Such a mail server may be a hardware based device or a software service that executes on the sending device 104, message manager 108, receiving device 112, and/or third-party device 116.

Sending device 104, message manager 108, receiving device 112, and third-party device 116 may each represent a broad range of digital systems known in the art, including but not limited to devices such as wireless mobile phones, palm sized personal digital assistants, notebook computers, desktop computers, servers, set-top boxes, game consoles and the like.

Following creation of the derived message 124, the message manager 108 may then forward it to the receiving device 112 via a selected delivery channel. In various embodiments, the message manager 108 may also generate and transmit a notification message 128 to a third-party device 116 to, e.g., notify an interested party of selected details of the transaction including, but not limited to, information on the sender, the receiver, the requested content information, and/or the one or more digital content elements provided in the derived message. This third-party notification may, for example, provide a local sales representative with information that a prospective customer has inquired about one or more products and/or services.

In one embodiment, a message manager 108 may delay the transmission of the derived message 124 pending indication from a third-party user that the derived message 124 should be sent. Such an indication could be a reply or specified interaction with the notification message 128. This may provide notice to the third-party user prior to actual transmission of the derived message 124. This pre-notification, coupled with the inclusion of content related to the third-party user, e.g., a digital business card, may provide the perception, to the recipient, that the third-party user has generated the derived message, with little actual effort expended on behalf of the third-party user.

In an embodiment, various acknowledgement messages, e.g., messages 132, 136, and 140, may be transmitted to communicate various activities such as, but not limited to, receipt and/or read activities.

Embodiments of the present invention may provide teachings to leverage a relatively simple message construct 120 into a potentially more sophisticated derived message 124 delivering content in a manner that may be tailored to aspects of the receiving environment. Transmission of the message construct 120 may be accomplished without the need for significant processing power, bandwidth, memory, and/or authoring involvement at the sending device 104 that would otherwise be necessary for control of all aspects of the message construction. Thus, embodiments of the present invention present the option of employing thin-client devices for the sending device 104; however, embodiments are not so limited.

Figure 2:
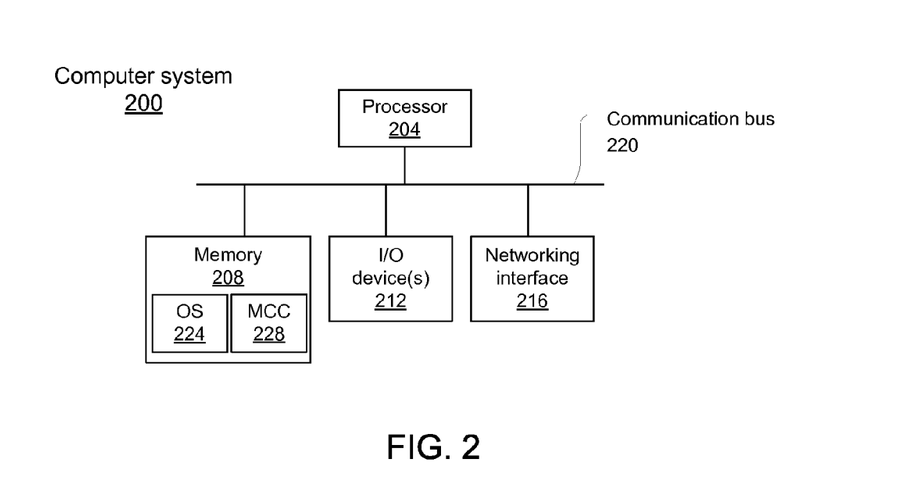
FIG. 2 illustrates a computer system generally suitable for use as a sending device in accordance with an embodiment of the present invention.

FIG. 2 illustrates a computer system 200 generally suitable for use as sending device 104 in accordance with an embodiment of the present invention. In this embodiment, the system 200 may include a processor 204, memory 208, input/output device(s) 212, and a networking interface 216, coupled to each other via a communication bus 220. During operation, memory 208 may store working copies of an operating system (OS) 224 and message construct component (MCC) 228, which may include an implementation of an application programming interface (API), in a volatile storage element; while a non-volatile storage element may be used for persistent storage of the OS 224 and MCC 228. The implementation of the API may be based on an XML-processing model such as, but not limited to, a document object model (DOM), a simple API for XML (SAX), an ECMAScript for XML E4X, etc.

In various embodiments, the memory 208 may include a variety of storage mediums such as, but not limited to, volatile memory, e.g., random access memory (RAM), dynamic RAM (DRAM), static RAM (SRAM), and the like; non-volatile memory, e.g., read-only memory (ROM), electrically erasable-programmable ROM (EEPROM), Flash, and the like; and removable memory, e.g., compact disk (CD); digital versatile disk (DVD), Flash, and the like.

In an embodiment a persistent copy of the MCC 228 may be downloaded from a distribution server through a data network, installed in the factory, or in the field. For field installation, the persistent copy may be distributed using one or more articles of manufacture such as diskettes, CDROM, DVD, Flash and the like, having a recordable medium including but not limited to magnetic, optical, and other mediums of the like.

In various embodiments the processor 204 may include one or more of a microprocessor (having one or more processing cores), a controller, an application specific integrated circuit, and the like. The processor 204 may perform the function of executing programming instructions of OS 224 and MCC 228 to enable the operations of the various elements as described herein.

In various embodiments the input/output device(s) 212 may include a display device including but not limited to a CRT and an active or passive matrix LCD display, to output a user interface, the creation of which may be controlled by instructions of the MCC 228. The input/output device(s) 212 may also include input mechanisms including but not limited to: a mouse; a touch pad; a track ball; a keyboard; a bar-code scanner; a Bluetooth transceiver; an infrared transceiver; radio-frequency identification transceiver, and the like to facilitate user input into the system 200.

Lastly, in various embodiments the networking interface 216 may represent a wireless network interface, an integrated services digital network (ISDN) adapter, a digital subscriber line (DSL) interface, an Ethernet or Token ring network interface, and the like.

Figure 3:
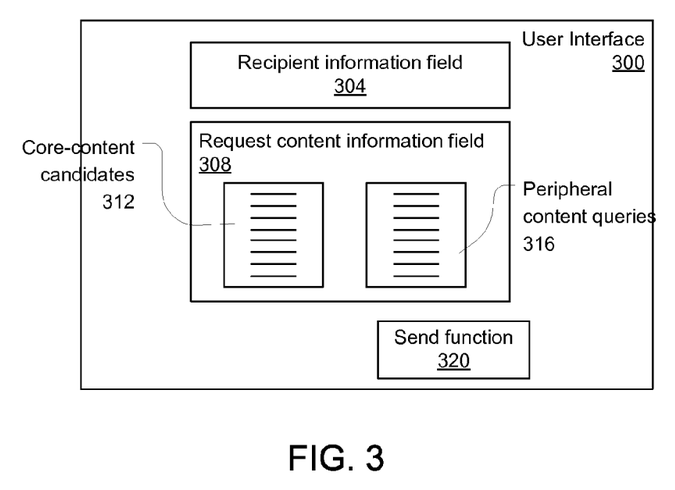
FIG. 3 illustrates an example of a user interface in accordance with an embodiment of the present invention.

FIG. 3 illustrates an example of a user interface 300 suitable for output on display of sending device 104 in accordance with an embodiment of the present invention. The user interface 300 may include a recipient information field 304 and a requested content information field 308, values for which may be input by an operator using one or more input devices such as those described above. The recipient information field 308 may receive an electronic address, e.g., an e-mail address, a phone number, etc., of the recipient. In another embodiment, the recipient information field 308 may include a unique identifier of the recipient, which may be linked with an electronic address of the recipient at the message manager 108.

The requested content information field 308 may provide a user with a selection of core-content candidates 312. The core-content candidates 312 may be selected from a list of, for example, products and/or services, for which the message manager 108 may have access to the associated content. The core-content candidates 312 may be presented to the user in a variety of ways such as, but not limited to, a check-the-box selection or through a pull-down menu.

In an embodiment, the requested content information field 308 may additionally/alternatively provide for peripheral content queries 316 directed to solicit information on peripheral content that may be of relevance. In some embodiments, the peripheral content queries 316 may be dependent upon which of the core-content candidates 312 is selected.

In some embodiments, the MCC 228 may query the message manager 108 for population of the requested content information field 308, including, for example, the current core-content candidates 312. The requested content information field 308 may be customized based at least in part on user credentials, device configuration, and/or device operational capabilities. For example, in accordance with an embodiment of the present invention, the message manager 108 may populate the requested content information field 308 based upon an identification of the operational capabilities of the sending device 104. For example, traditional wireless devices, such as mobile phones and personal digital assistants, may be equipped with less powerful hardware (including displays, processors, and memory) and software components than their wireline counterparts. Therefore, if the sending device 104 is identified as such a device it may be advantageous to adapt the requested content information field 308 to account for such potential limitations. This may be done, for example, by providing a reduced set of peripheral content queries 316. On the other hand, in an embodiment where the sending device 104 has significant resources, e.g., is a desktop computing device, the set of peripheral content queries 316 may be more comprehensive. The identification of the operational capabilities of the sending device 104 may be done through, e.g., association with user credentials, transmission of capability information from the sending device 104 to the message manager 108 at a handshake operation, resulting from a query, an unprompted transmission, etc.

Once, the appropriate information has been added to the appropriate fields, the user may transmit the message construct 120 to the message manager 108 using a send function 320. The activation of the send function 320 may cause the MCC 228 to create a file including the values given for the various fields, which may be transmitted as the message construct 120. In some embodiments, the file created by the MCC 228 may be, but is not limited to, a general purpose markup language, e.g., ASN.1 (Abstract Syntax Notation One), EBML, XML, YAML, etc.

While the illustrated embodiment shows the core-content candidates 312 and the peripheral content queries 316 depicted side-by-side on the same screen, other embodiments, may provide a series of screenshots including the various fields.

Figure 4:
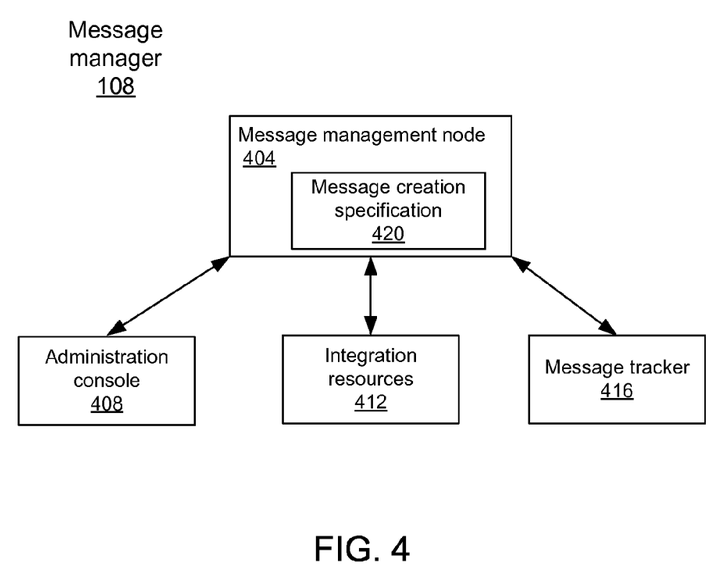
FIG. 4 illustrates a message manager in accordance with an embodiment of the present invention.

FIG. 4 illustrates the message manager 108 in accordance with an embodiment of the present invention. The message manager 108 may include a message management node 404 communicatively coupled to an administration console 408, integration resources 412, and a message tracker 416. The message management node 404 may include a message creation specification 420 for directing creation of the derived message 124.

The administration console 408 may provide authoring services for an authorized administrator. The authoring services may include services to facilitate creation and/or editing of the message creation specification 420, locally stored content, rules, and other administrative tasks. Additionally, the authoring services may provide a message-template editing environment through which an administrator may compose/edit message templates including, for example, format definitions and/or content definitions for one or more of the cells within the template. In one embodiment, the authoring services may provide graphical or text-based tools.

In some embodiments, if the appropriate digital content to be associated with the requested content information may not be locally accessible, the message management node 404 may cooperate with integration resources 412 in order to acquire such content. In various embodiments, the integration resources 412 may include, for example, external content management systems, database management systems, etc.

The message tracker 416 may include a database to track various activities and/or events. These activities and/or events could include information on the sender, the recipient, the message construct 120, the derived message 124, acknowledgement message 136, which may include information on recipient interaction with derived message 124, for example, which digital content elements are activated by recipient, etc. In some embodiments, a message record of these activities and/or events may be transmitted notification message 128.

Figure 5:
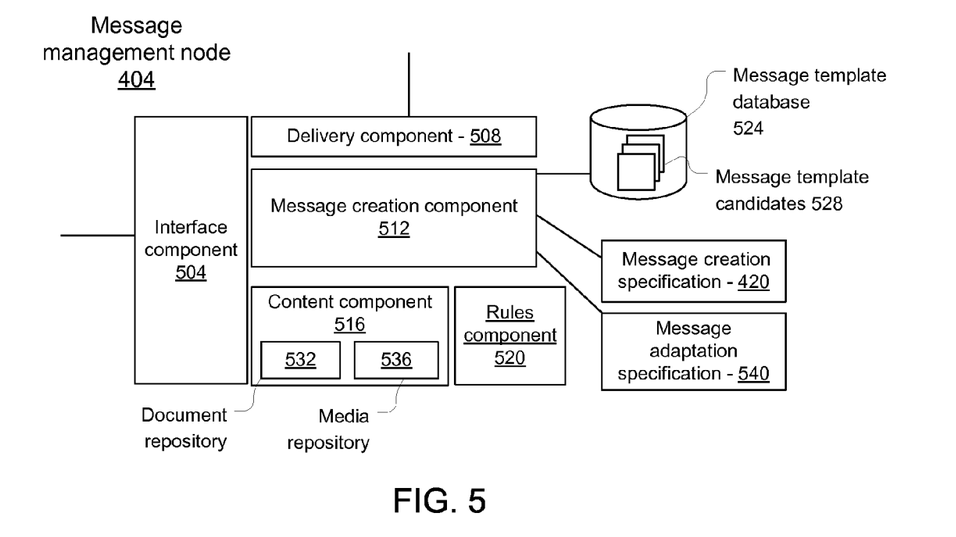
FIG. 5 illustrates a message management node in accordance with an embodiment of the present invention.

FIG. 5 illustrates the message management node 404 in more detail in accordance with an embodiment of the present embodiment. The message management node 404 may include an interface component 504, a delivery component 508, a message creation component 512, a content component 516, and a rules component 520.

As used herein, the term 'component' is intended to refer to programming logic that may be employed to obtain a desired outcome. The term component may be synonymous with 'module' and may refer to programming logic that may be embodied in hardware or firmware, or in a collection of software instructions, possibly having entry and exit points, written in a programming language, such as, for example, C++. In various embodiments, components may be co-located in the same device, e.g., a server, may be located in a device dedicated to the particular component's function, or may distributed over a collection of devices cooperatively interacting to obtain the outcome described.

A software component may be compiled and linked into an executable program, or installed in a dynamic link library, or may be written in an interpretive language such as BASIC. It will be appreciated that software components may be callable from other components/modules or from themselves, and/or may be invoked in response to detected events or interrupts. Software instructions may be embedded in firmware, such as an EEPROM or may be stored on a readable medium such as a magnetic or optical storage device. It will be further appreciated that hardware components may be comprised of connected logic units, such as gates and flip-flops, and/or may be comprised of programmable units, such as programmable gate arrays or processors. In one embodiment, the components described herein are implemented as software modules, but nonetheless may be represented in hardware or firmware. Furthermore, although only a given number of discrete software/hardware components may be illustrated and/or described, such components may nonetheless be represented by additional components or fewer components without departing from the spirit and scope of embodiments of the invention.

Interaction of the components of the message manager 108 may now be described with additional reference to operational phases illustrated in FIG. 6 in accordance with an embodiment of the present invention. Operational phases may be referenced by numerals in parentheses. In an embodiment, an operation may begin by the interface component 504 receiving the message construct 120 (604). The interface component 504 may be any type of interface to facilitate reception/transmission of electronic messages over a network from/to networked devices, e.g., devices 104, 112, and 116. The interface component 504 may support various application interfaces for message composition and delivery triggers, as well as reporting interfaces. The interface component 504 may include an implementation of an API having a common set of definitions as the MCC 228, described above, to facilitate interpretation of the message construct 120. In various embodiments, the interface component 504 may be compatible with a variety of web services protocols including, but not limited to, those directed toward communication of markup language files.

The message creation component 512 may receive the message construct 120, or portions thereof, from the interface component 504. The message creation component 512 may identify the values of the message construct 120 (608) and may operate to generate the derived message 124 according to the message creation specification 420. To generate the derived message 124 the message creation component 512 may access a message template database 524, having a plurality of message template candidates 528 stored therein, in order to select a message template that is suitable for delivery of the digital content element deemed to satisfy the requested content information (612).

In the generation of the derived message 124, the message creation component 512 may also select the delivery channel, which may influence the selection of the message template and/or the digital content. In some embodiments, the selection of the delivery channel may be determined through rules provided by rules component 520 and/or through the message creation specification 420. Furthermore, embodiments of the present invention may allow for the dynamic determination of the delivery channel based upon network conditions (e.g., available bandwidth in alternative communication links), device capabilities, device preferences, etc. This may be further incorporated with teachings of the message adaptation operations below.

The message creation component 512 may also activate the content by accessing the content component 516 to select the one or more digital content elements (616). The content component 516 may include a document repository 532 having, e.g., text and/or binary elements, a media repository 536 having, e.g., audio and/or video elements, suitable to provide accessible storage of the various types of digital content elements. As discussed above, if the digital content associated with the requested content information value is not found in the content component 516, it may be accessed through integration resources 412.

In various embodiments, the message creation component 512 may link and/or embed the selected digital content elements with the selected message template. During formation of the derived message 124, digital content elements may be linked to the message template or may be embedded within message template through techniques such as object linking and embedding (OLE), or the use of uniform resource identifiers (URIs) or uniform resource locators (URLs) for example. Other methods of linking and/or embedding digital content elements to a message template may similarly be employed without departing from the spirit and scope of the embodiments of the present invention.

In some embodiments, the message creation component 512 may also generate the derived message 124 with reference to a message adaptation specification 540 to provide a flexible and extensible adaptation of the derived message 124 for delivery to the intended recipient.

In one embodiment, message adaptation specification 540 may include a message layer definition to define alternative presentations or layers for a given derivative electronic message, where each presentation may represent a different combination of digital content element candidates. In one embodiment, the derived message 124 may include one or more content cells that may be adapted to include a version of one or more digital content elements selected from the digital content element candidates 528 as may be appropriate for a given message presentation. As such, it may be possible to generate an electronic message that may be adapted to take advantage of particular configurations and/or preferences.

In one embodiment, message adaptation specification 540 may be device-specific or user-specific. For example, message adaptation specification 540 may indicate one or more operational capabilities of one or more devices, such as receiving device 112 associated with the intended recipient. Such operational capabilities may include multimedia presentation capabilities of a device, content rendering capabilities of a device, data throughput/bandwidth capabilities of a device, and may identify whether a device is configured as a wireless device or traditional, non-wireless or wireline device, and so forth. Additionally, message adaptation specification 540 may further represent user-specific (or company/entity-specific) preferences such as a message filtering level indicating, e.g., a preferred message delivery policy with respect to one or more recipients. In one embodiment, message adaptation specification 540 may represent a collection of user-specific or device-specific message adaptation specifications that may be selectively employed based upon identification of an intended recipient of the derived message 124.

In embodiments utilizing adaptive configuration of the derived message 124, the delivery component 508 may cooperate with the message creation component 512 to dynamically determine the capabilities and/or preferences of a recipient and/or receiving device 112 through execution of one or more client-side or server-side components or scripts. Accordingly, a recipient may receive the derived message 124 including one or more scripts or components, or links to one or more remotely located scripts or components, which when executed, may determine various capabilities of the receiving device 112 and request supplemental digital content elements accordingly. Alternatively, device capabilities may be predetermined and stored e.g., in the rules component 520, for access via a lookup table, file, or database by message adaptation specification 540. As such, electronic messages may be remotely adapted with one or more content element candidates prior to transmission of the message to a recipient. Of course, electronic message adaptation may be conditioned on other factors besides device capabilities.

In some embodiments, the derived message 124 may be dynamically adapted after transmission to the receiving device 112. For example, the derived message 124 may be transmitted with alternatively versioned content element candidates 528 programmed to respond by activating the appropriate version based on capabilities/preferences at the receiving device 112.

In some embodiments, the base electronic message may include an initial content layer, to which client-side scripts and recipient-specific customization information may be added through the adaptation process. The added client-side scripts may perform such functions as: reporting on the opening of the email message; reporting on the activation of digital content elements; testing the digital content capabilities of the receiving device 112; selecting the most appropriate layer of the derived message 124 to be exposed to the user based upon the results of the tests; and supplementing (including possibly replacing) the contents of the derived message 124 with those of the selected layer.

Figure 6:
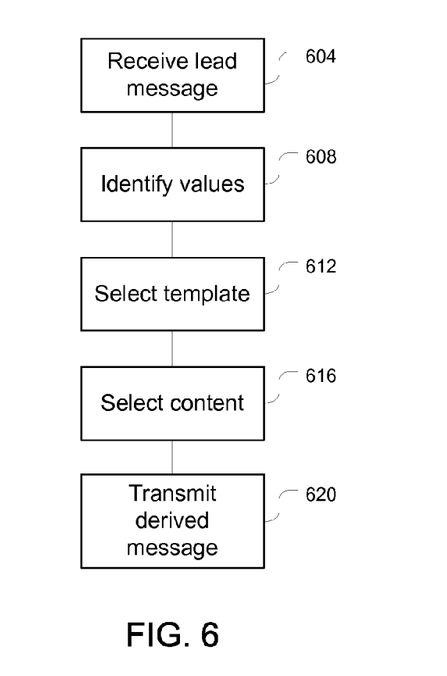
FIG. 6 illustrates an operation of a message management service in accordance with an embodiment of the present invention.

While FIG. 6 illustrates the message creation specification 420 and the message adaptation specification 540 as two separate entities, in other embodiments they may be integrated.

Adaptive configuration of the derived message 124 may be based on the teachings of the above mentioned, and fully incorporated, U.S. patent application No. 60/393,176, Ser. Nos. 10/611,698, and/or 10/976,057.

Upon creation of the derived message 124, the message creation component 512 may cooperate with a delivery component 508 to transmit the derived message 124 to the receiving device 112 (620).

In some embodiments, the rules component 520 may maintain and manage business rules associated with the composition and delivery of the derived message 124 and/or the notification message 128. These rules may be created manually through, e.g., the administration console 408, or automatically based on, e.g., message delivery and performance. In various embodiments, the rules component 520 may ensure that messages comply with legal statutes and/or corporate branding policies; may facilitate the maintenance of privacy of sender data, recipient data, and/or content; may ensure appropriate deliverability, e.g., through execution of spam-filter analysis before the derived message 124 is transmitted. The rules component 520 may additionally/alternatively provide rules adapted to ensure that the derived message 124 contains proper content based on sender identification, sender locale, recipient domain, date, etc. In various embodiments, some/all of these rule-check operations may be incorporated within the message creation specification 420. Additionally, in various embodiments, the message creation specification 420 may be more directly coupled to the rules component 520, rather than to the message creation component 512.

Figure 7:
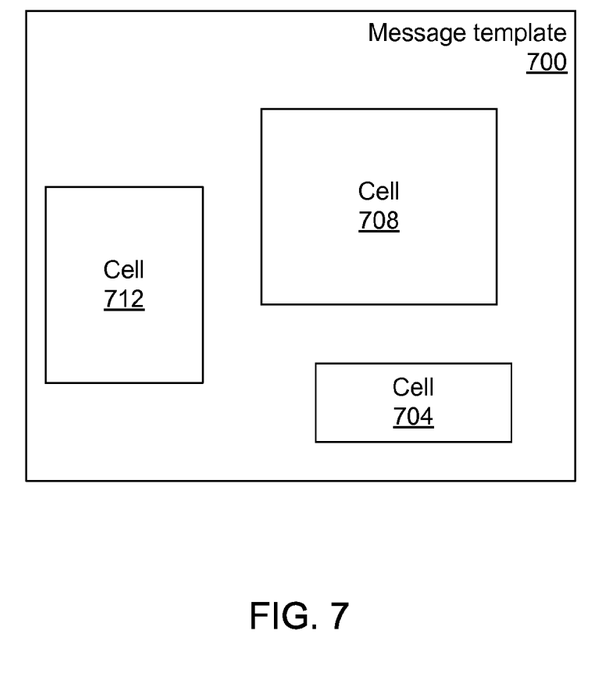
FIG. 7 illustrates a message template in accordance with an embodiment of the present invention.

FIG. 7 illustrates a message template 700 in accordance with an embodiment of the present invention. The message template 700 may have cells 704, 708, and 712, each associated with a digital content element, or a type of digital content elements. In various embodiments, the cell selection and arrangement of the message template 700 may be customized based on a variety of factors including, for example, requested content, the recipient, the seller, date, channel delivery, etc. For example, the cell 704 may be associated with an image file of certain dimensions. In an embodiment, the sender's credentials may be associated with rules to provide a digital business card identifying the seller and may, therefore, utilize the cell 704 for an image of the sender's business card. However, a sender of another embodiment may have rules associated that do not provide for this particular item of personalization and therefore, cell 704 may be deactivated or used for another content element.

In some embodiments, the cells may be customized based at least in part on operational capabilities and/or preferences at the receiving device 112. For example, in an embodiment, the cell 708 may be suitable for delivery of video element while the cell 712 may be suitable for an image element. If, in an embodiment, it is determined that the receiving device 112 is not to receive video messages, the cell 708 may be deactivated and a like-topic, but differently versioned, content element may alternatively be displayed in cell 712.

In various embodiments, a variety of customization options relating to the message templates may be employed.

Figure 8:
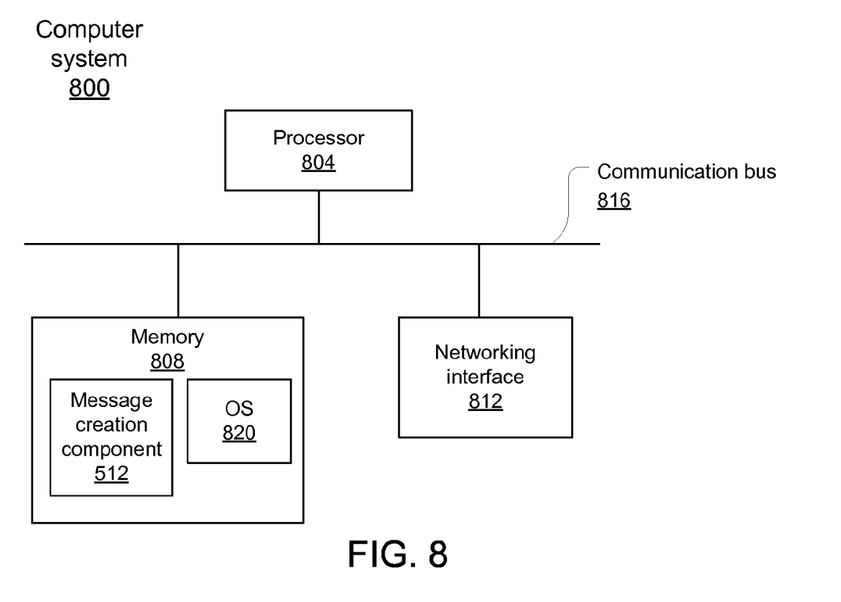
FIG. 8 illustrates a computer system generally suitable for implementing message creation component in accordance with an embodiment of the present invention.

FIG. 8 illustrates a computer system 800 generally suitable for implementing message creation component 512 in accordance with an embodiment of the present invention. In this embodiment, the system 800 may include a processor 804, memory 808, and a networking interface 812, coupled to each other via a communication bus 816. During operation, memory 808 may store working copies of an OS 820 and message creation component 512 in a volatile storage element; while a non-volatile storage element may be used for persistent storage of the OS 820 and message creation component 512.

In various embodiments the processor 804 may be, for example, a microprocessor (having one or more processing cores), a controller, an application specific integrated circuit, and the like. The processor 804 may perform the function of executing programming instructions of OS 820 and the message creation component 512 to enable the operations of the various elements as described herein.

In various embodiments, the memory 808 may include a variety of storage mediums such as, but not limited to, volatile memory, e.g., RAM, DRAM, SRAM, and the like; non-volatile memory, e.g., ROM, EEPROM, Flash, and the like; and removable memory, e.g., CD; DVD, Flash, and the like.

Lastly, in various embodiments, networking interface 812 may represent a wireless network interface, an ISDN adapter, a DSL interface, an Ethernet or Token ring network interface, and the like.

Although specific embodiments have been illustrated and described herein, it will be appreciated by those of ordinary skill in the art that a wide variety of alternate and/or equivalent implementations calculated to achieve the same purposes may be substituted for the specific embodiment shown. This application is intended to cover any adaptations or variations of the embodiments discussed herein.

What is claimed is:

1. In a computing system, a method of operation comprising:
    transmitting, by the computing system to a first network device associated with a sender, a plurality of core-content candidates for selection, each of the plurality of core-content candidates being associated with a product and/or service;
    receiving, by the computing system from the first network device via a first electronic message, a message construct with construct information to be used in construction of a second electronic message, the construct information including an identification of a recipient and requested content information that includes a core content selection selected from the plurality of core-content candidates;
    identifying a message creation specification;
    accessing, by the computing system from a source other than the first network device, one or more digital content elements associated with the core content selection;
    constructing the second electronic message to include the one or more digital content elements, based at least in part on the message creation specification and the first electronic message; and
    transmitting the second electronic message to a second network device associated with the recipient.

2. The method of claim 1, wherein said accessing the one or more digital content elements comprises accessing the one or more digital content elements from a local content repository or through integration resources.

3. The method of claim 2, wherein at least one of the one or more digital content elements is selected from a corresponding plurality of differently versioned digital content elements candidates, the method further comprising:
    identifying a message adaptation specification; and
    identifying the at least one of the selected one or more digital content elements based at least in part on the message adaptation specification.

4. The method of claim 3, wherein identifying a message adaptation specification comprises determining one or more operational capabilities of the second network device.

5. The method of claim 1, wherein the identification of the recipient includes an electronic address.

6. The method of claim 1, wherein said generating of the second electronic message comprises:
    selecting a message template, from a message template library;
    selecting the one or more digital content elements; and
    associating the selected message template with the selected one or more digital content elements.

7. The method of claim 1, further comprising:
    authenticating credentials of the sender and/or the recipient; and
    selecting the one or more digital content elements based at least in part on said authenticating of credentials.

8. The method of claim 1, further comprising:
    identifying a message adaptation specification for adapting the second electronic message; and
    selecting, based at least in part upon the message adaptation specification, the one or more digital content elements from a corresponding number of differently versioned digital content element candidates.

9. The method of claim 1, further comprising:
    identifying a message adaptation; and
    adapting the second message based at least in part on the message adaptation specification.

10. The method of claim 1, wherein the first electronic message includes an extensible markup language (XML) file.

11. The method of claim 1, wherein the requested content information includes a peripheral content selection, and the method further comprises:
    transmitting one or more peripheral content candidates to the first network device for selection.

12. The method of claim 11, comprising:
    identifying operational capabilities of the first network device; and
    identifying the one or more peripheral-content candidates based at least in part on said identifying of the operational capabilities of the first network device.

13. The method of claim 1, wherein said generating of the second electronic message further comprises:
    receiving data selected from the group consisting of capabilities of the receiving device, preferences of the second network device, and network conditions; and
    selecting a delivery channel for the second electronic message based at least in part on said receiving of data.

14. The method of claim 1, wherein the message creation specification comprises a message layer definition to define a plurality of alternative presentations for the second electronic message, wherein each of the plurality of alternative presentations include a different combination of digital content elements and the method further comprises:
    testing operational capabilities of the second network device; and
    selecting one of the plurality of alternative presentations for the second electronic message based at least in part on said testing.

15. An apparatus comprising:
    a processor; and
    a storage medium, coupled to the processor, having instructions stored therein, which, when executed by the processor cause the apparatus to:
        transmit, to a first network device associated with a sender, a plurality of core-content candidates for selection, each of the plurality of core-content candidates being associated with a product and/or service
        receive an identification of a recipient and requested content information via a first electronic message, from the first network device;
        identify a message creation specification;
        access, from a source other than the first network device, one or more digital content elements associated with the core content selection;
        generate a second electronic message, including the one or more digital content elements, based at least in part on the message creation specification and the first electronic message; and
        transmit the second electronic message to a second network device associated with the recipient.

16. The apparatus of claim 15, wherein the instructions, which, when executed by the processor, further cause the apparatus to:

acess the one or more digital content elements from a local content repository or through integration resources.

17. The apparatus of claim 16, wherein the apparatus is to select at least one of the one or more digital content elements from a corresponding plurality of differently versioned digital content elements candidates, and the instructions, which, when executed by the processor, further cause the apparatus to:
   identify a message adaptation specification; and
   identify the at least one of the selected one or more digital content elements based at least in part on the message adaptation specification.

18. A system embedded in a computer readable storage medium, the system comprising:
   an interface component configured to transmit, to a first network device associated with a sender, a plurality of core-content candidates for selection, each of the plurality of core-content candidates being associated with a product and/or service, the interface component further configured to receive a first electronic message, from the first network device, including an identification of a recipient and requested content information that includes a core content selection selected from the plurality of core-content candidates;
   a content component configured to access, from a source other than the first network device, one or more digital content elements associated with the core content selection;
   a message creation component, including a message creation specification, coupled to the interface component and the content component and configured to generate a second electronic message that includes the one or more digital content elements based at least in part on the message creation specification and the first electronic message; and
   a delivery component coupled to the message creation component, configured to transmit the second electronic message to a second device associated with the recipient.

19. The system of claim 18, further comprising:
   a message template database, coupled to the message creation component, having a plurality of message template candidates.

20. The system of claim 19, wherein the message creation component is further configured to
   select a message template from the plurality of message template candidates, based at least in part on the message creation specification and the first electronic message; and
   generate the second electronic message with the message template.

* * * * *

UNITED STATES PATENT AND TRADEMARK OFFICE
CERTIFICATE OF CORRECTION

| | | |
|---|---|---|
| PATENT NO. | : 7,634,556 B2 | Page 1 of 1 |
| APPLICATION NO. | : 11/296587 | |
| DATED | : December 15, 2009 | |
| INVENTOR(S) | : Huynh et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 987 days.

Signed and Sealed this

Ninth Day of November, 2010

David J. Kappos
*Director of the United States Patent and Trademark Office*